United States Patent [19]
Gentry

[11] Patent Number: 5,089,131
[45] Date of Patent: Feb. 18, 1992

[54] CORROSION RESISTANT FILTER UNIT

[75] Inventor: J. Michael Gentry, Duncan, Okla.

[73] Assignee: Halliburton Company, Duncan, Okla.

[21] Appl. No.: 268,820

[22] Filed: Nov. 8, 1988

[51] Int. Cl.⁵ ........................................... B01D 35/153
[52] U.S. Cl. ................................. 210/253; 210/335;
210/340; 210/450; 210/497.01; 138/31
[58] Field of Search .................. 138/31; 210/253, 335,
210/340, 346, 450, 486, 497.01, 497.2

[56] References Cited

U.S. PATENT DOCUMENTS

| | | |
|---|---|---|
| 3,945,923 | 3/1976 | Rogers et al. .................. 210/253 |
| 4,442,866 | 4/1984 | Loukonen ........................ 138/31 |
| 4,664,798 | 5/1987 | Bergh ............................. 210/253 |
| 4,944,875 | 7/1990 | Gaignet .......................... 210/335 |

Primary Examiner—Robert A. Dawson
Assistant Examiner—Wanda L. Millard
Attorney, Agent, or Firm—James R. Duzan; Joseph A. Walkowski

[57] ABSTRACT

The present invention is a multi-bank, transportable filter unit wherein all connections are mechanical and are isolated from the fluid being filtered.

10 Claims, 4 Drawing Sheets

CORROSION RESISTANT FILTER UNIT

BACKGROUND OF THE INVENTION

This invention relates to filtration of fluids employed in completion and treatment of oil and gas wells. After a well is drilled, the well bore wall, and most critically, the wall at the location in which the well bore intersects the producing oil and/or gas formation, has become contaminated with the drilling fluid or "mud" utilized in the drilling operation. In order to remove the mud solids, commonly termed filter cake, from the well bore wall and to clean the formation pores, a number of different fluids may be pumped into the well and circulated. In some formations, acid, such as hydrochloric acid, acetic acid, formic acid, hydroflouric acid and others, with appropriate retarders, inhibitors, surfactants and other additives, all of which are well known in the art, are used to treat the formation by removing filter cake, shrink or remove clays, alleviate cement damage to the formation and remove iron deposits, scale deposits and other contaminants present in the well bore and formation. In other formations, non-acidic treatments may similarly be employed. All of the above treatments may in and of themselves produce the desired beneficial results in the producing formation, or may in many instances serve as pre-treatments for subsequent operations such as fracturing or gravel packing.

In any event, a major problem experienced by service companies and operators is the introduction into wells of contaminants suspended in the treatment fluids. Such contaminants include rust from tanks, lines and pumps, sediment from tank bottoms due to incomplete cleaning after prior jobs, bacterial contaminants, and the dust and dirt generally present at a well site. Ideally, treatment fluids would be filtered immediately prior to entry into the well.

Numerous prior art attempts have been made to provide effective, single-pass filtering for some treatment fluids, as discussed in U.S. Pat. No. 4,428,425, wherein plate-type filters are employed to filter completion brines. Such filters are effective, but are restricted to very low pressures (several hundred psi maximum) and so must be employed upstream of high pressure pumps, rather than on the discharge side thereof immediately prior to injection in the well. Moreover, such filters cannot, by their design, be used to filter acids. Another approach has been the use of cartridge-type filters in banks, wherein one bank of filters can be shut off and filter cartridges changed while filtering continues through the other bank. Such a device, in the form of a transportable skid unit, has been developed and is sold by Special Projects Manufacturing, Inc. of Forth Worth, Tx., as the SPM High pressure Filter Unit. This apparatus, however, possesses inherent design defects as it uses welded joints and pipe thread connections throughout, both of which are extremely susceptible to failure after repeated or lengthy exposure to acids, and the latter of which tends, particularly under high pressures, to leak badly.

SUMMARY OF THE INVENTION

In contrast to the prior art, the present invention comprises a multi-bank, transportable filter unit wherein all connections are mechanical and are isolated from the fluid being filtered, and are preferably of a hammer union type for rapid, easy assembly, disassembly, repair and replacement of components without the need for special tools.

BRIEF DESCRIPTION OF THE DRAWINGS

The present invention will be more readily understood by one of ordinary skill in the art through a review of the following detailed description of the preferred embodiment, taken in conjunction with the accompanying drawings, wherein.

DETAILED DESCRIPTION AND OPERATION OF THE PREFERRED EMBODIMENT

Referring now to FIG. 1–4 of the drawings, the layout and construction of the preferred embodiment of the present invention will be described.

Figure 1:
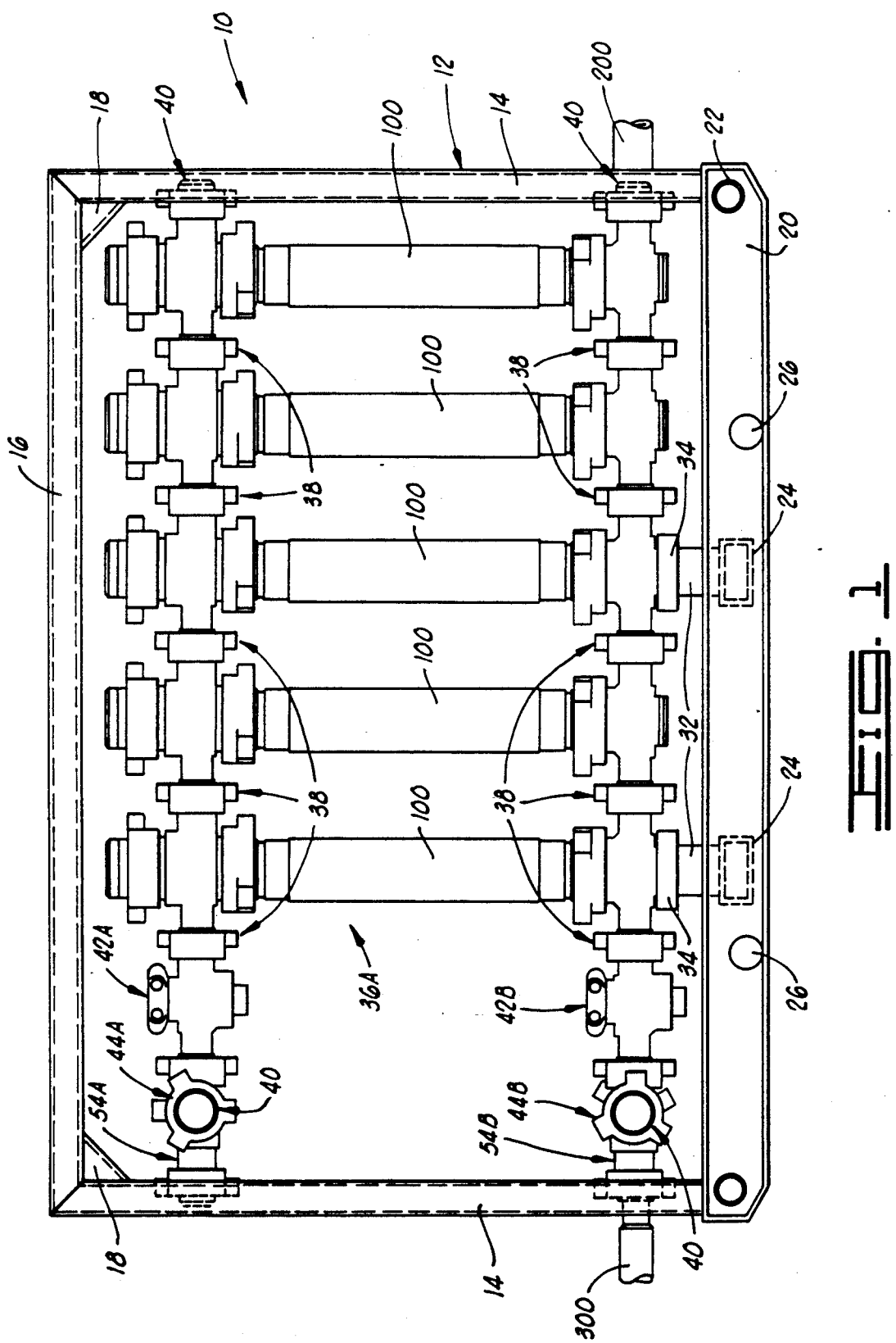
FIG. 1 comprises a side elevation of a skid unit version of the present invention.
Figure 3:
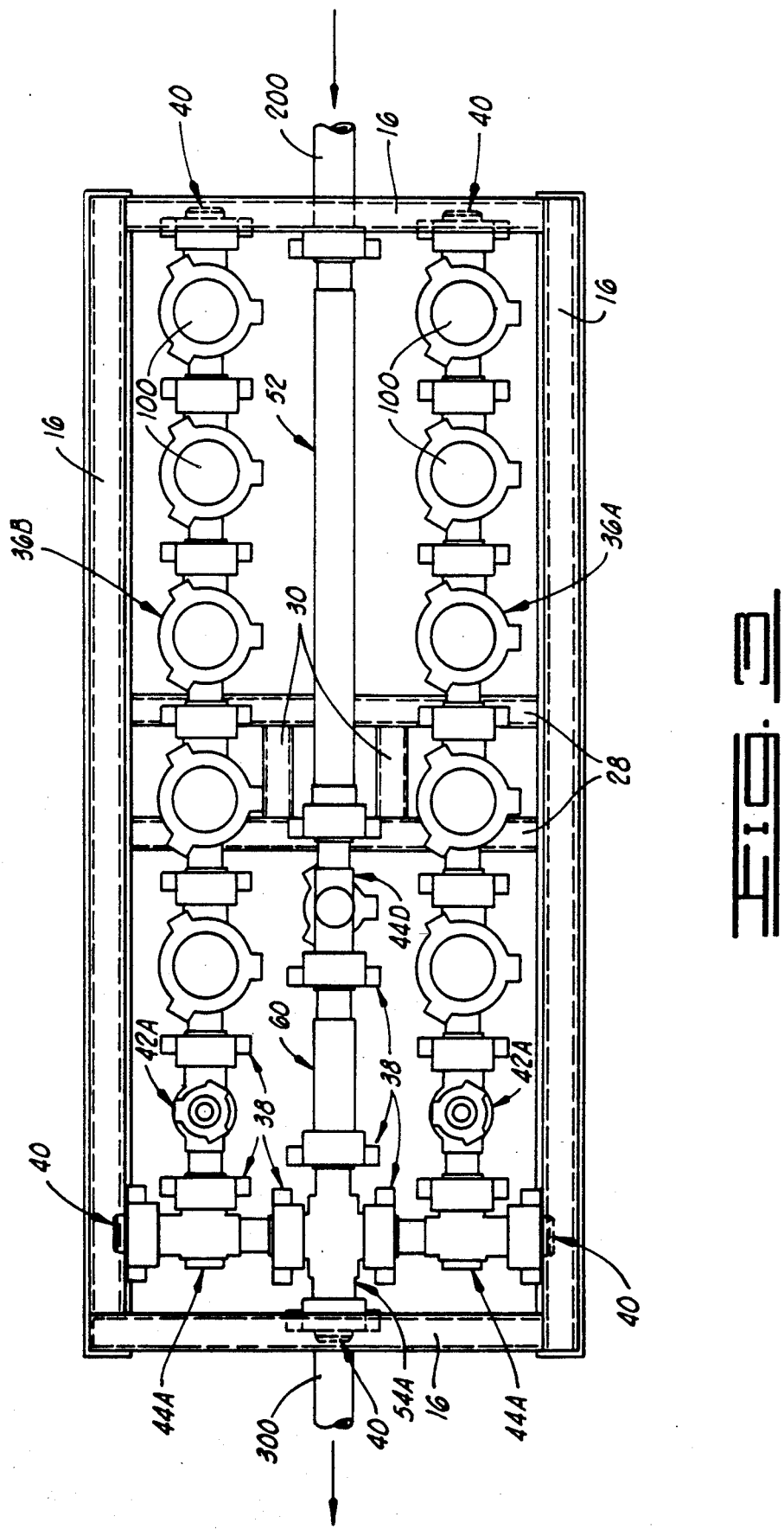
FIG. 3 comprises a top elevation of the skid unit depicted in FIG. 1, showing the inlet and outlet manifold from the top, extending between two banks of filter pods.

Referring specifically to FIGS. 1 and 3, filter unit 10 is mounted inside of a frame 12, comprising a box-type corner support columns 14 crowned by box-type beams 16 welded thereto including corner braces 18, and supported by longitudinally-extending I-beam sole plates 20 laterally linked by tubular struts 22 and rectangular box-type struts 24 (which also serve as forklift runners), all of the latter components also being welded together. Sheet steel (not shown) extends across the width and length of the bottom of the unit, forming a floor pan to capture leaks, drain apertures 26 extending through sole plates 20 being adapted for connection to hoses to transmit leaked fluids away from the filter units, an important feature for offshore usage. At the top of frame 12 (see FIG. 3), box-type lifting beams 29 extend across the width of the unit between and welded to side beams 16, and are cross-braced with and welded to beams 30, to provide a support structure for lifting filter unit 10 via a lifting eye (not shown).

Four short filter bank supports 32 extend upwardly from struts 24 to which they are welded, in alignment with a like number of filter pods 100, supports 32 being secured to the bottom of pods 100 via bolt-on collars 34. Collars 34 may either comprise half-circumferential segment linked by diametrically placed bolts, or other suitable design as is known in the art. In either case, the collars employ interior annular shoulders cooperatively engaged with annular grooves on the exterior of pads 100 and struts 32 (see FIG. 4).

The foregoing is illustrative of a support structure for filter unit 10, is not intended as a limitation of its applicability to, or utility with, other, differing structures, and does not form a part of the present invention.

Turning again to FIG. 1, filter bank 36A, one of two filter banks, 36A and 36B, of filter unit 10 is illustrated from the side. Each filter bank 36 comprises a plurality of filter pods 100 laterally connected in parallel to each other via threaded hammer unions 38 at their top and bottom ends, such unions being well known in the art and termed, among others, as "WECO" unions after a manufacturer thereof. Such unions provide a means for assuring a fluid-tight seal in a high pressure environment, being commonly utilized at well sites to contain fluids under working pressures of up to 15,000 psig and greater. At the right-hand end of filter bank 36A as shown in FIG. 1, male union blanks 40 are employed as plugs.

At the left-hand end of filter bank 36A (again, as shown in FIG. 1), valves 42A and 42B are secured thereto, again by unions 38 at the top and bottom courses of filter pods 100 of filter bank 36 for the purpose of opening and closing fluid flow to (valve 42A) and from (valve 42B) filter bank 36. Valves 42 may be of any design, but are preferably rotating plug valves of the type known as LO TORC ® plug valves, manufactured and sold by Halliburton Services of Duncan, Okla.

Figure 2:
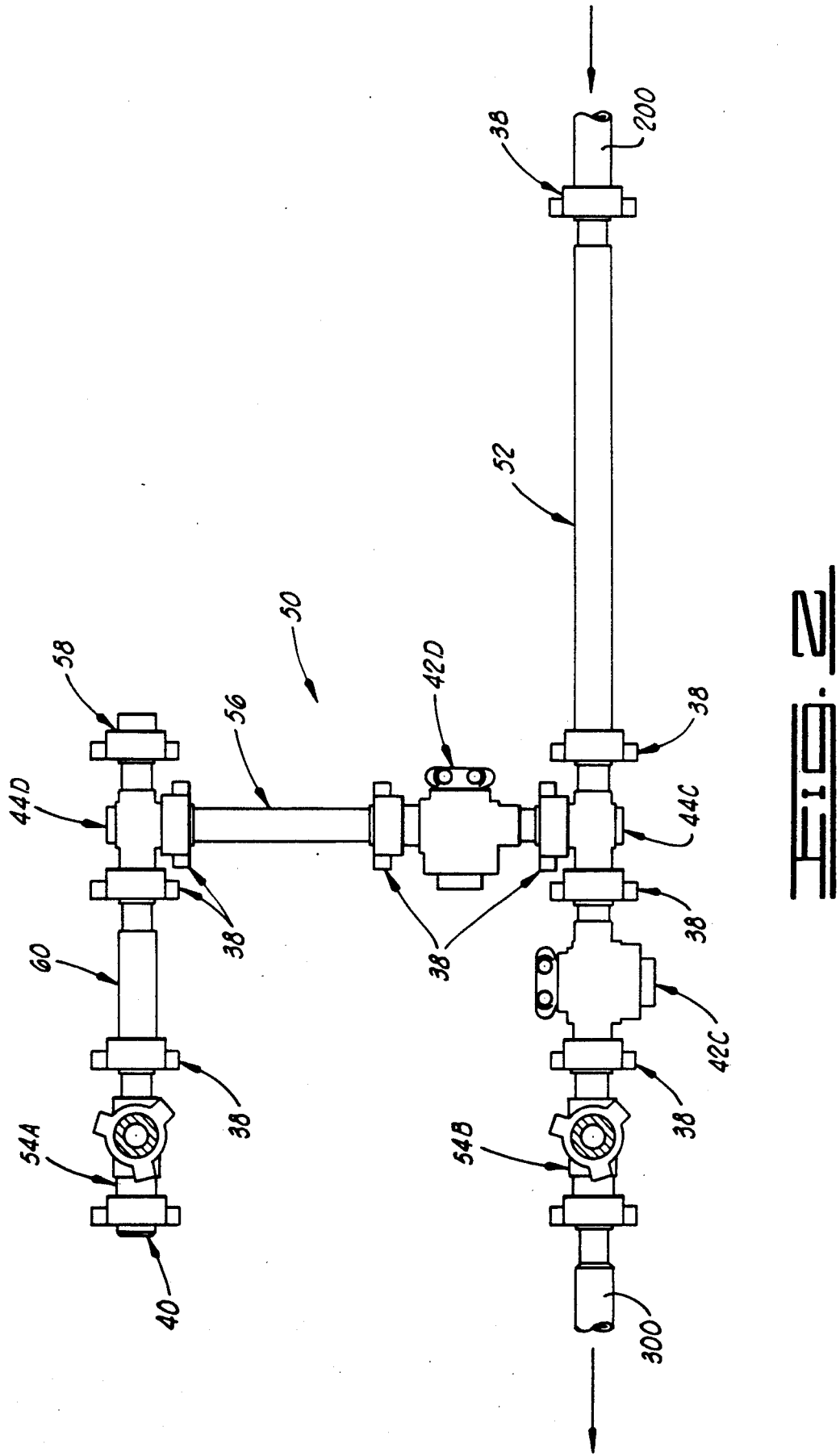
FIG. 2 comprises a side elevation of the inlet-outlet manifold employed in the present invention.

Valves 42A and 42B are secured by unions 38 to tees 44A and 44B, which extend laterally inwardly from filter bank 36A to inlet-outlet manifold 50, shown in FIG. 2. The outer ends of tees 44A and 44B are closed off by male union blanks 40. Filter bank 36B is comprised of the same type and number of components as 36A, but is a mirror-image thereof.

Inlet-outlet manifold 50 is disposed midway between and parallel to, filter banks 36A and 36B (see FIG. 3 for clarity). Manifold 50 includes long tubular discharge joint 52 at its right-hand (inlet) end as depicted in FIG. 3, joined to a tee 44C at its left-hand (outlet) end via a union 38. The left (outlet) side, of tee 44C is secured to the inlet of a valve 42C via another union 38, and the opposite (outlet) side of valve 42C to cross 54B by a union 38. The upwardly-extending (outlet) leg of tee 44C secured to joint 52 is secured to the inlet of another valve 42D via a union 38, and the outlet of this valve 42D is secured to a tubular changeover nipple 56 via a union 38, the upper, outlet end of which is secured to the inlet leg of top tee 44D, the right-hand outlet of which is plugged by a female union blank 58 and the left-hand outlet of which is secured to the inlet of a short tubular discharge joint 60 via a union 38. The outlet of joint 60 is secured to a cross 54A via a union 38. The longitudinally outer end of top cross 54A is plugged by a blank union 40. The laterally outer ends of both top and bottom crosses 54A and 54B are secured to top and bottom tees 44A and 44B, respectively, at the left-hand ends of filter banks 36A and 36B via unions 38 (see FIG. 3 for illustration of top cross connections).

Figure 4:
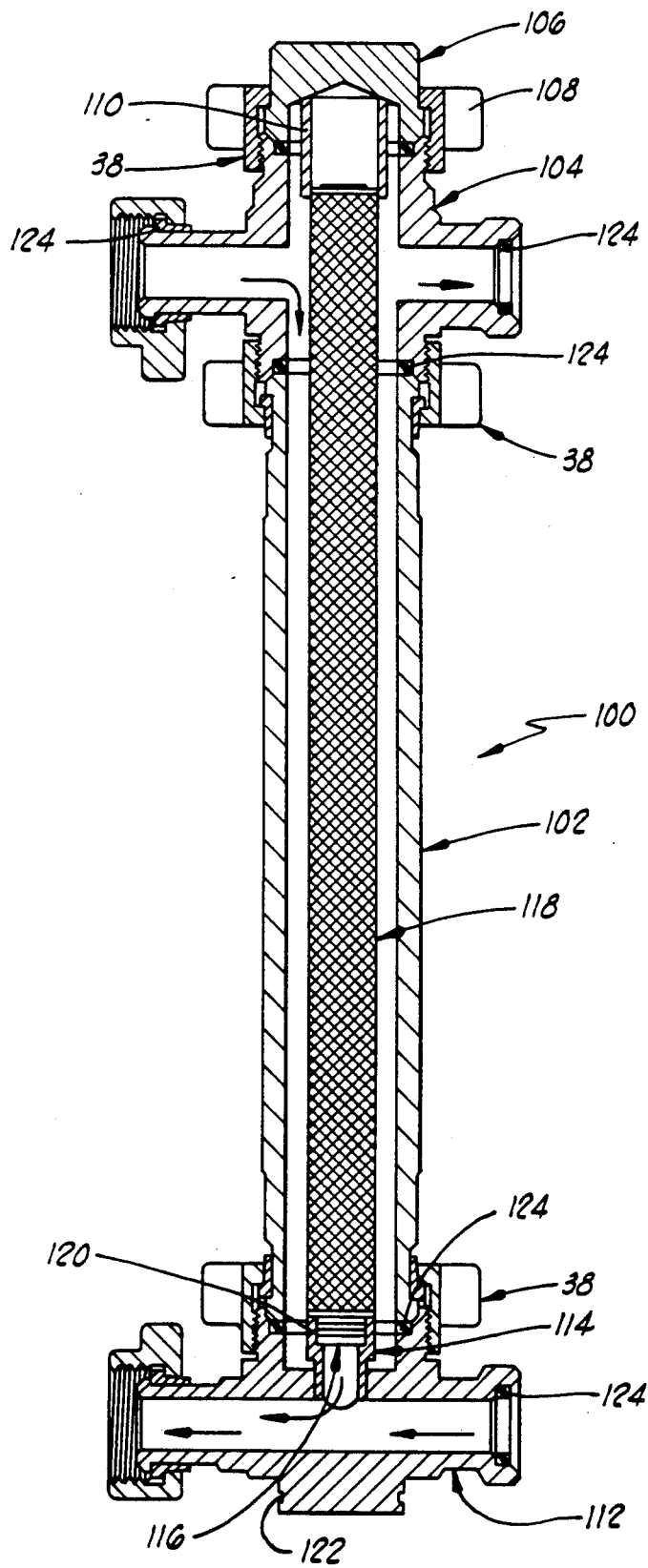
FIG. 4 is a vertical section of a filter pod as employed in the present invention.

Turning now to FIG. 4 of the drawings, an exemplary filter pod 100 will be described in detail. Filter pods 100 each include a tubular cartridge vessel 102, surmounted by a upper filter housing 104 in the form of a cross and secured to housing 104 by a union 28. Housing 104 is capped by a modified male union blank 106 maintained thereon by nut 108 to form a blank union 38. The interior of union blank 106 includes filter cartridge bracket 110. The bottom of cartridge vessel 102 is secured to the upstanding leg of tee-shaped lower filter housing 112 via a union 38. Centered in the upstanding leg of lower filter housing 112 is filter cartridge support 114, adapted to receive the nipple 116 at the lower end of replaceable filter cartridge 118, a fluid-tight seal being effected therebetween by multiple o-rings 120. While filter cartridge 118 as disclosed herein is disposable, it is also contemplated that commercially available nondisposable cartridges of sintered stainless steel or ceramic composition could also be used in the present invention, and that such cartridges could be backwashed and replaced in the filter pods during operation and thereafter in lieu of utilizing disposable cartridges. While the dimensions of the filter pods might be altered to accomodate the backwashable filter cartridges, such alteration is not outside the spirit and scope of the invention as claimed. The bottom of lower filter housing 112 is flat, and possesses a previously-referred to annular groove 122 in the exterior thereof, for engagement by a collar 34 in a manner previously discussed, to secure filter unit 10 to frame 12.

It should be noted at this time that all unions 38 include a seal thereat, the seal being of Viton ® or other suitable resilient acid and corrosion-resistant material to provide a fluid-tight sealing engagement between parts of the assembly and to isolate the mechanical connection members of the union from the corrosive fluids being filtered. Such seals are devoted illustratively on FIG. 4 as 124. It will be appreciated that this type of connection as illustrated in FIG. 4 recurs throughout filter unit 10, and varies only by the size of the components (valves, tees, crosses, joints, nipples, etc.) being interconnected. This type of connection is, in fact, the only connecting means employed in filter unit 108 thereby eliminating welds and pipe threads such as are employed in the prior art. Of course, both the male and female union blanks employed as plugs throughout filter unit 10 have associated therewith such a Viton ® seal for fluid tightness and corrosion resistance under high pressures in the same manner as the other, non-blank union connections, the filter unit 10 as a whole being intended to accomodate working pressure of 10,000 psig.

While the unions 38 employed in the preferred embodiment of the invention have been disclosed as WECO unions, it should be understood that other suitable types of unions might be employed, as long as they provide a fluid tight seal to isolate the mechanical union connection from the corrosive fluids being filtered. For example, a clamp-type union having two hubs clamped together with a seal therebetween, as exemplified by the commercially available so-called Grayloc ® union or Big Inch ® unions employed by Halliburton Services of Duncan, Okla., is entirely suitable for use in the present invention.

All components of filter unit 10 are machined out of steel forgings and raw stock steel which, again, in the absence of the welds and pipe connections as employed in the prior art, promotes a long service life with a large safety margin. In addition, all of the valves employed are ideally of the LO TORC ® design as previously noted, which permits maintenance and changeout of components without removal of the valves from the unit. Further, such valves are available with special, corrosion resistant components for acid service. Finally, it should be appreciated that all of the unit's valves are accessible from one end of the unit for ease and rapidity of operation.

Operation of filter unit 10 will now be described with reference to all of the drawing figures. Fluid is introduced under pressure from high pressure pumps at the well site into filter unit 10, ideally immediately prior to the fluid injection point into the well. Fluid is received (see FIG. 2) by joint 52 of inlet-outlet manifold 50 from high pressure swivel joint 200 to which it is secured by a union 38, and routed via tee 44C upward through valve 12D, valve 42C being in its closed position. The fluid then travels upward through changeover nipple 56 into tee 44D, into short discharge joint 60, into cross 54A, thereafter traveling laterally (out of and into the drawing sheet of FIG. 2) where it is received by tees 44A (see FIG. 3) of filter banks 36A and 36B. One or both filter banks 36 may be used to filter fluid at the same time. Assuming that both are initially employed, valves 42A, of both banks 36 will be open, and the fluid from tees 44A will travel into filter pods 100 (see FIG. 1) via upper filter housings 104, which are connected in parallel, as heretofore noted, by unions 38. The fluid then enters the interior of filter cartridges 118 through the filter element itself, which may be varied to effectively filter particulate material down to a size of ½ micron. Such filter cartridges are commercially available and well known in the art.

Subsequent to filtration, fluid exits the interior of cartridges 118 into lower filter housings 112, and travels to the left as shown in FIG. 1 through a series of such housing 112 connected by unions 38 through valves 42B and tees 44B, then laterally inwardly to lower cross 54B, and out of cross 54B to the well via discharge swivel joint 300.

In the event that a reduction in flow rate occurs, or the differential pressure between the top and bottom legs of filter banks 36 increases, signaling that the filter cartridges are becoming clogged, one of the banks 36 may be taken out of service while flow continues through the other by closing valves 42A and 42B for that bank, and removing male union blanks 106 from the filter pods 100 of that bank by hammering units 108. Filter cartridges 118 can then be removed and replaced with new ones in a matter of minutes, blank 106 being replaced and secured on pods 100 by hammering units 108. The opposite bank may then be closed off after opening the first bank's valves 42A and 42B, and the filter cartridges of the latter replaced.

If both filter banks have become clogged and no further cartridges are on hand, flow can then be bypassed direct to discharge swivel joint 300 by opening valve 42C of inlet-outlet manifold and closing valve 42D, thus giving straight-through flow with no filtration.

It will thus be readily apparent to one of ordinary skill in the art that a novel and unobvious filter unit has been invented with advantages heretofor unknown in the art. The modular component construction of the unit makes assembly, disassembly and repair far easier than in prior art units, while still providing required fluid-tightness under a high pressure, corrosive environment in a much safer and more secure manner than the prior art due to absence of welds and pipe thread connections in any component exposed to fluid. While a specific, two filter bank configuration is disclosed, other, multi-bank or even single bank configurations may be employed. Other types of filter cartridges may be employed, and other types of valves, such as ball valves or gate valves, utilized. Other and further additional, deletions and modifications to the preferred embodiment may be made without departing from the spirit and scope of the claimed invention.

I claim:

1. A fluid filter assembly adapted for the filtration of corrosive fluid to be injected into a well bore at pressure levels which may exceed 10,000 pounds per square, said filter assembly comprising:

a frame assembly for the mounting of a portion of said fluid filter assembly therein, the frame assembly including:

a plurality of longitudinally extending sole plates;
   a plurality of struts laterally linking the plurality of longitudinally extending sole plates at least two of the plurality of struts having a rectangular cross-section being adapted for use in lifting said fluid filter assembly by inserting a lifting member therein;
   a plurality of vertical corner support columns, each vertical corner support column of the plurality of vertical corner support columns having one end thereof secured to a longitudinally extending sole plate of the plurality of longitudinally extending sole plates;
   a plurality of longitudinally extending members, each member having the ends thereof secured to a vertical corner support column of the plurality of vertical corner support columns;
   a plurality of laterally extending members, each member having the ends thereof secured to a vertical corner support column of the plurality of vertical corner support columns; and
   a plurality of supports extending upwardly from and secured to selected struts of the plurality of struts laterally linking the plurality of longitudinally extending sole plates, each support of the plurality of supports having a collar formed on the upper end thereof;
   a plurality of filter pods, the plurality of filter pods forming at least two banks of filter pods, each bank having at least two filter pods therein, each bank of the filter pods being supported by one or more the supports of the plurality of supports secured to selected struts of the plurality of struts of the frame assembly;
   an inlet manifold to direct said corrosive fluid to the plurality of filter pods, the inlet manifold being interconnected to the banks of filter pods formed by the plurality of filter pods whereby flow of said corrosive fluid can be directed to each bank of the filter pods;
   an outlet manifold to direct said corrosive fluid from the plurality of filter pods, the outlet manifold being interconnected to the banks of filter pods formed by the plurality of filter pods whereby the flow of said corrosive fluid can be directed to each bank of the filter pods and being interconnected to the inlet manifold whereby said corrosive fluid can be directed from the inlet manifold to the outlet manifold;
   a first valve means to control the flow of said corrosive fluid between banks of filter pods formed by the plurality of filter pods whereby the flow of said corrosive fluid can be selectively directed to each bank of the filter pods;
   a second valve means to selectively control the flow of said corrosive fluid between the inlet manifold and the outlet manifold; and
   union means for interconnecting the filter pods, inlet manifold and outlet manifold, each of the union means including mechanical connection means and internal seal means for isolating said corrosive fluids from the mechanical connection means;
   wherein said fluid filter assembly is adapted for use in the filtration of corrosive fluid to be injected into a well bore at pressure levels which may exceed 10,000 pounds per square inch or more while said filter unit comprises a plurality of filter pods, an inlet manifold, an outlet manifold, first valve means and second valve means inconnected by union means to eliminate any welded connections therebetween and facilitate the operation and maintenance of the filter pods.

2. The apparatus of claim 1, wherein the filter pods, inlet manifold and outlet manifold each include a plurality of components, and the components are interconnected by union means.

3. The apparatus of claim 2, wherein all of the union means are of the same type.

4. The apparatus of claim 3, wherein the union means comprise WECO unions.

5. The apparatus of claim 2, further comprising:
the first valve means and second valve means being interconnected with the filter pods and the manifolds by union means.

6. A fluid filter assembly adapted for the filtration of fluid at pressure levels which may exceed 10,000 pounds per square, said filter assembly comprising:
a frame assembly for the mounting of said fluid filter assembly therein, the frame assembly including:
a plurality of longitudinally extending sole plates;
a plurality of struts laterally linking the plurality of longitudinally extending sole plates at least two of the plurality of struts having a rectangular cross-section being adapted for use in lifting said fluid filter assembly by inserting a lifting member therein;
a plurality of vertical corner support columns, each vertical corner support column of the plurality of vertical corner support columns having one end thereof secured to a longitudinally extending sole plate of the plurality of longitudinally extending sole plates;
a plurality of longitudinally extending members, each member having the ends thereof secured to a vertical corner support column of the plurality of vertical corner support columns;
a plurality of laterally extending members, each member having the ends thereof secured to a vertical corner support column of the plurality of vertical corner support columns; and
a plurality of supports extending upwardly from and secured to selected struts of the plurality of struts laterally linking the plurality of longitudinally extending sole plates, each support of the plurality of supports having a collar formed on the upper end thereof;
a plurality of filter pods, the plurality of filter pods forming at least two banks of filter pods, each bank having at least two filter pods therein, each bank of the filter pods being supported by one or more the supports of the plurality of supports secured to selected struts of the plurality of struts of the frame assembly;
an inlet manifold to direct said fluid to the plurality of filter pods, the inlet manifold being interconnected to the banks of filter pods formed by the plurality of filter pods whereby flow of said fluid can be directed to each bank of the filter pods;
an outlet manifold to direct said fluid from the plurality of filter pods, the outlet manifold being interconnected to the banks of filter pods formed by the plurality of filter pods whereby the flow of said fluid can be directed to each bank of the filter pods and being interconnected to the inlet manifold whereby said fluid can be directed from the inlet manifold to the outlet manifold;
a first valve means to control the flow of said fluid between banks of filter pods formed by the plurality of filter pods whereby the flow of said fluid can be selectively directed to each bank of the filter pods;
a second valve means to selectively control the flow of said fluid between the inlet manifold and the outlet manifold; and
union means for interconnecting the filter pods, inlet manifold and outlet manifold, each of the union means including mechanical connection means and internal seal means for isolating said fluids from the mechanical connection means;
wherein said fluid filter assembly is adapted for use in the filtration of fluid at pressure levels which may exceed 10,000 pounds per square inch or more while said filter unit comprises a plurality of filter pods, an inlet manifold, an outlet manifold, first valve means and second valve means inconnected by union means to eliminate any welded connections therebetween and facilitate the operation and maintenance of the filter pods.

7. The apparatus of claim 6, wherein the filter pods, inlet manifold and outlet manifold each include a plurality of components, and the components are interconnected by union means.

8. The apparatus of claim 6, wherein all of the union means are of the same type.

9. The apparatus of claim 7, wherein said union means comprise WECO unions.

10. The apparatus of claim 6, further comprising: the first valve means and second valve means being interconnected with the filter pods and the manifolds by union means.

* * * * *